United States Patent Office 3,419,848
Patented Dec. 31, 1968

3,419,848
NAVIGATIONAL SYSTEM
Erich Zipse, Oftersheim, and Horst Brendes, Sandhausen, Germany, assignors to Teldix Luftfahrt-Austrustungs-G.m.b.H., Heidelberg-Wieblingen, Germany
Filed May 10, 1965, Ser. No. 454,360
Claims priority, application Germany, May 14, 1964, T 26,190
11 Claims. (Cl. 340—24)

ABSTRACT OF THE DISCLOSURE

An indicating device for indicating the position of a craft with respect to the surface of the earth and which includes means forming a map whose surface is divided into at least two regions which are scale representations, in two dimensions, of respective regions on the surface of the earth. The regions of the map are constituted by surface portions having different electrical conductivity with one of the surface portions being an electrically conductive surface portion. An electric contact is arranged to engage the surface of the map means, and means are provided for causing the means and the contact slide to occupy a position relative to each other which is representative of the position of the craft with respect to the surface of the earth. Signaling means are connected in circuit with at least the electrically conductive surface portion of the map means and the electric contact slide for indicating whether or not the slide is in engagement with the electrically conductive surface portion. A signal which indicates that the contact slide engages the electrically conductive surface portion thus indicates that the position of the craft is over that region of the earth which, on the map, is represented by this conductive portion.

---

The present invention relates to a navigational system, especially to a system which is capable of warning the pilot or navigator of a craft when he has crossed or is about to cross a given line of demarcation or when he has transgressed or is about to transgress a prohibited zone, and which system is able, independently of any ground equipment, to put the coordinates of the geographical position occupied, at the moment, by the craft whose position is to be indicated by the system.

More particularly, the present invention relates to a system which incorporates two components, one of them being an indicator device which itself is arranged such that should the craft cross a given line or enter a certain restricted zone, a signal is triggered which apprises the pilot of this fact. The other component is a coordinate converter which is coupled to a self-contained navigation unit, i.e., a unit which itself is able to put out, independently of any cooperating ground equipment, coordinate values representing the instantaneous geographical position of the craft, this coordinate converter being able to convert the coordinate signals put out by the self-contained navigation unit into coordinate, signals which will accurately drive the indicator device.

The pilot who uses a piece of navigational equipment is frequently faced with the problem of not going beyond a certain geographical line of demarcation or of not overflying certain prohibited or restricted zones. This means that the pilot must at all times know precisely where the line or zone is and what his own position is with respect to this line or zone. A suitable indication of this can be obtained only by making the piece of navigational equipment which is used compare the coordinates of the position of the craft continuously with the line or zone, but despite advanced automation, the pilot or navigator of the craft must then still continually monitor the display device of the equipment.

Inasmuch as the crew of an aircraft, particularly the pilot of a single-seat craft, will usually find himself fully occupied simply with the task of operating the aircraft, particularly under instrument conditions, he will find himself hardpressed continuously to monitor the display device of the navigation system, and it is, therefore, one of the objects of the present invention to provide a piece of navigational equipment of the above type, namely, a piece of navigational equipment which tells the pilot the position of the craft with respect to the line or region that he should not overfly, with means which, when the pilot crosses or is about to cross a certain geographical line, or enters or is about to enter a certain region, automatically calls the pilot's attention to this fact.

It is another object of the present invention to provide a coordinate converter which is able to convert the coordinate signals put out by a self-contained navigation unit into coordinate signals which will correctly drive the above-mentioned means which automatically call attention to the fact that the craft is crossing a certain line. The problems underlying this conversion, and the manner in which they are solved in accordance with the instant invention, will be explained more fully below.

With the above objects in view, the present invention resides in an indicating device for indicating the position of a craft with respect to the surface of the earth and which includes means forming a map whose surface is divided into at least two regions which are scale representations, in two dimensions, of respective regions on the surface of the earth. The regions of the map are constituted by surface portions having different electrical conductivity with one of the surface portions being an electrically conductive surface portion. An electric contact is arranged to engage the surface of the map means, and means are provided for causing the means and the contact slide to occupy a position relative to each other which is representative of the position of the craft with respect to the surface of the earth. Signalling means are connected in circuit with at least the electrically conductive surface portion of the map means and the electric contact slide for indicating whether or not the slide is in engagement with the electrically conductive surface portion. A signal which indicates that the contact slide does engage the electrically conductive surface portion would thus indicate that the craft's position is over that region of the earth which, on the map, is represented by this conductive portion.

The present invention also resides in a coordinate converter which is capable of converting the coordinate signals put out by a self-contained navigation unit into coordinate signals which will correctly drive an indicating device of the above type.

Additional objects and advantages of the present invention will become apparent upon consideration of the following description when taken in conjunction with the accompaying drawings in which.

Figure 1:
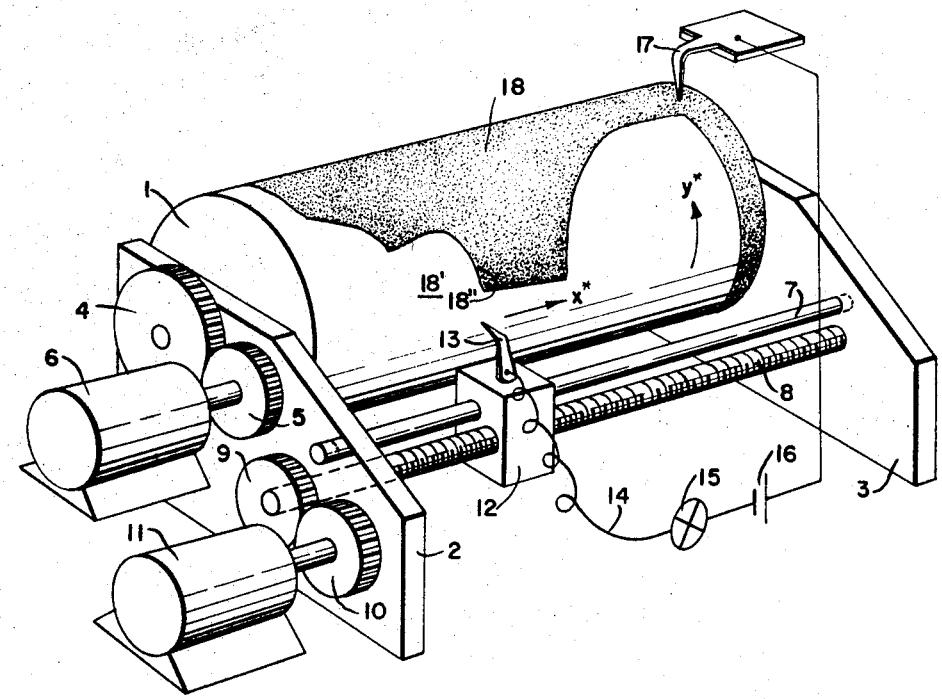
FIGURE 1 is a perspective view of the indicator component of the system according to the present invention by which a signal is triggered when the craft crosses or is about to cross a given line, or enters or is about to enter a prohibited zone.

Referring now to the drawings, and first to FIGURE 1 thereof, the same shows an indicator device forming part of a system according to the present invention, which indicator device includes a cylindrical drum or roller 1, the same being mounted for rotation in two end plates 2 and 3 and provided with a driving gear 4. The roller 1 is driven by a servomotor 6 whose shaft carries a further gear 5 which is in mesh with the gear 4. A stationary guide rod 7 extends between the plates 2 and 3, the longitudinal axis of this guide rod 7 being parallel to the axis of the roller 1. Also arranged between the plates 2 and 3 is a threaded spindle 8 whose axis is likewise parallel to the axis of the roller 1. An end of the spindle 8 carries a gear 9 which is in mesh with yet another gear 10 which itself is driven by a second servomotor 11. A slide element 12 is mounted for reciprocatory movement along the guide rod 7, this guide element 12 of itself being provided with an internal thread so as to be in threaded engagement with the threaded spindle 8. In this way, the slide element 12 may be moved to and fro between the plates 2 and 3, by energizing the servomotor 11. The arrangement of the parts will thus be seen to be such that the slide element 12 moves in a direction parallel to the axis of the roller 1.

The slide element 12 carries at its upper surface a curved contact slide 13 which comes to a point. This slide 13 is electrically connected, via a lead 14, an indicator lamp 15, and a voltage source 16, with a stationary contact slide 17 which likewise is curved and comes to a point.

The roller 1 carries what may be considered a map, i.e., a representation of the ground which differs from a conventional map in that the surface of the roller 1 is provided with a region constituted, for example, by a layer 18 which has good electrical conductive properties, while the remainder 18' of the surface of the cylindrical roller 1 is made of a non-conductive material. The line 18" between the two regions 18 and 18' is a faithful scale reproduction, in two dimensions, of the critical line which the pilot should not overfly, and/or of the start of the region into whose entry the pilot should be appraised of.

If, now, the position of the craft, as represented by the coordinates $x^*$ and $y^*$, is applied to the servomotors 6 and 11, the slide 13 is made to contact the appropriate portion of the surface of the roller 1. That is to say, the contact slide 13 will move in response to $x^*$ and the roller 1 will rotate in response to $y^*$. As a result, the point of the contact slide 13 will occupy, relative to the surface of the roller 1, a position which reflects the position of the craft with respect to the surface of the earth.

As soon as the point of the slide 13 comes into engagement with the region 18, i.e., with the conductive surface portion of the roller 1, the electrical circuit 13, 14, 15, 16, 17, 18, is closed and the indicator lamp 15 will be energized, thereby apprising the pilot of the fact that the craft has crossed the geographical line represented by the line 18" on the roller 1, and has entered the region of the earth's surface which, on the map, is represented by the conductive surface portion 18 of the roller 1.

Instead of providing an indicator lamp, the signalling means may be constituted by any other desired visual or audible signalling device.

Figure 2:
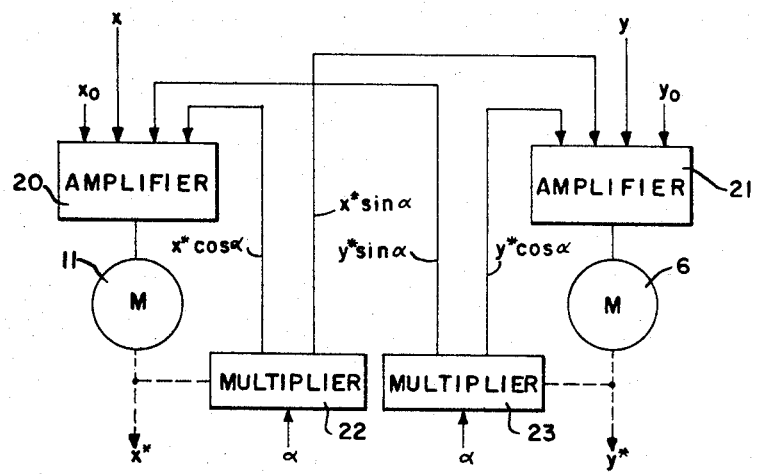
FIGURE 2 is a block diagram of the coordinate converter component of the system which responds to a self-contained navigation unit and which produces the control signals necessary for driving servomotors forming part of the indicator component shown in FIGURE 1.

FIGURE 2 is a block diagram, to be described in detail below, showing how the servomotors 11 and 6 are controlled in order that they will drive the slide 13 and roller 1 to assume the proper positions $x^*$ and $y^*$. Before proceeding with an explanation of FIGURE 2, however, it is believed that a brief explanation concerning the coordinate systems involved is in order.

It will be appreciated that, in order to bring about a relative movement between the surface of the roller 1 and contact slide 13, the system has to operate in a fixed coordinate system. However, a self-contained navigation unit, i.e., a unit which determines the position of the craft without the aid of earth-bound means, always puts the position of the craft in terms of coordinates which are related to a starting or end point, that is to say, a coordinate system which has a variable origin. It is, therefore, essential that the coordinates be converted. Due care must, however, be taken that the coordinates of the system having the variable origin (i.e., the coordinates put out by the navigation computer or other unit) be converted into the coordinates of the system having the fixed origin (i.e., the coordinates to be applied to the drive mechanism (for moving the roller 1 and the slide 13)), and not vice versa.

For purposes of explanation, it will be assumed that the two Cartesian coordinate systems are shifted and rotated with respect to each other. If the coordinates of the stationary system are designated $x^*$, $y^*$, and the coordinates of the variable system, i.e., the system whose origin depends on the starting or target point, are designated $x$, $y$, the conversion equations, solved for $x^*$ and $y^*$, are $$x^* = x \cos \alpha + y \sin \alpha - x^*_0$$

$$y^* = y \cos \alpha - x \sin \alpha - y^*_0$$

where $x^*_0$ and $y^*_0$ are th shifting coordinates in the $x^*$, $y^*$ system, and $\alpha$ is the angle by which the systems are angularly displaced with respect to the other.

If a system is to operate in accordance with the above equations, the individual summands have to be made available, preferably as electrical quantities, and then be added. Accordingly, the sum values which are formed and which correspond to $x^*$ and $y^*$ would have to be converted, via servocircuits, into mechanical changes of position of the position marker. This does not, however, produce the requisite accuracy of the mechanical $x^*$, $y^*$, values. This is so because the $x$, $y$, values put out by the navigational computer first have to be multiplied by sin and cos before they are introduced into the sum. This multiplication, however, makes it necessary that the output values of the navigational unit be pre-amplified, and this requires high-quality amplifiers having high input impedances if the $x$, $y$, values are to be kept sufficiently accurate and in order to avoid feedback to the navigational unit.

According to a further feature of the system of the present invention, these pre-amplifiers can be dispensed with. Instead, the electrical $x$, $y$, values coming from the navigation unit partake directly, and without being amplified, in the zero-balancing, and thus increases the accuracy with which the coordinates are converted. This is accomplished, as will be described below in conjunction with FIGURES 2 and 4, by letting the servomotors 11, 6, whose mechanical positions correspond to the $x^*$, $y^*$, coordinates, respectively, also move elements that partake in the coordinate conversion. One of these feedback values is multiplied by the cos of the angular displacement angle $\alpha$ and serves for forming the control magnitude of the particular servomotor from which it has been derived, while the other feedback value is multiplied by the sin of the angle $\alpha$ and is applied to the other servomotor.

Therefore, in contradistinction to the above-explained method, the system according to the present invention operates in accordance with the following pair of equations:

$$x = x_0 + x^* \cos \alpha - y^* \sin \alpha$$

$$y = y_0 + x^* \sin \alpha + y^* \cos \alpha$$

which implicitly contain the desired quantities $x^*$ and $y^*$. This set of equations is solved by mutually coupling the two servomechanism circuits. All that is required will be conventional servoamplifiers whose inherent inaccuracy, particularly insofar as their dependency on temperature is concerned, does not affect the final result.

Figure 3:
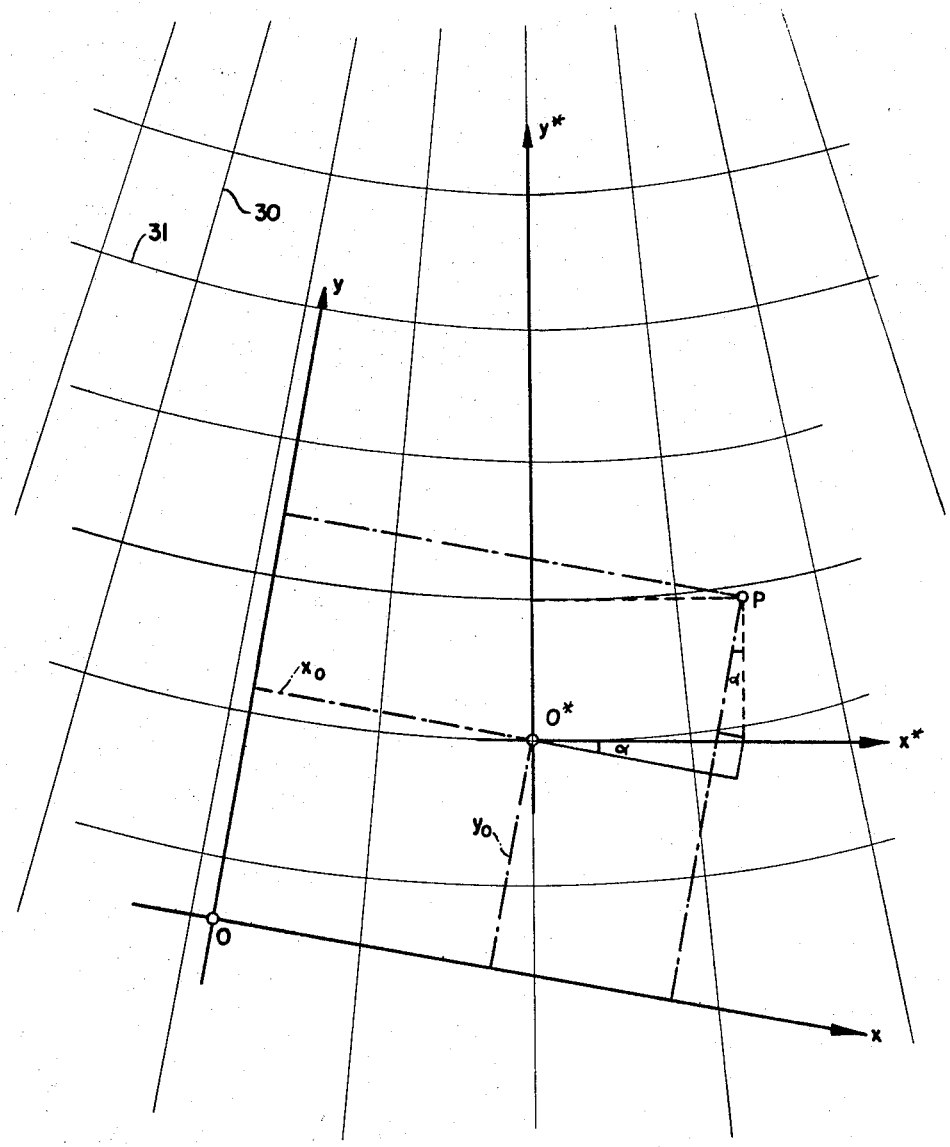
FIGURE 3 is a pictorial representation of a map grid, in conic projection, showing two Cartesian coordinate systems, the same being identified by the reference characters which will be referred to in the following specification.

The above explanation relating to the coordinate conversoin is illustrated graphically in FIGURE 3, which shows a grid coordinate system made up of converging radials 30 and concentric arcs 31, this being the grid of the conventional conic projection map. The radials 30 correspond to the meridians or longitudes and the arcs 31 to the latitudes. The piece of navigational equipment described in the instant application puts out the positon of the craft in a Cartesian coordinate system $x$, $y$, whose origin O is, for example, at the starting point of the flight and this, of course, may vary from flight to flight. In the coordinate system $x$, $y$, of the grid shown in FIGURE 3, the $y$-axis will coincide with the longitude passing through the origin O. Thus, if the starting point is changed, not only will the two positon coordinate systems be shifted with respect to each other, but also, they will be rotated with respect to each other as a result of the convergence of the map, so that coordinate system $x^*$, $y^*$ of the roller grid will likewise be shifted and rotated with respect to the system $x$, $y$, in which the navigation system puts out its coordinates. As stated above, the shifted coordinates in the system $x$, $y$, are designated by $x_0$ and $y_0$, while the rotational angle between the two systems is identified as $\alpha$.

The electrically generated $x$, $y$ values of the geographical position P of the aircraft, which are put out by the self-contained navigation unit, are converted into the mechanical positions $x^*$ and $y^*$ in accordance with the following equations:

$$x = x_0 + x^* \cos \alpha - y^* \sin \alpha$$
$$y = y_0 + x^* \sin \alpha + y^* \cos \alpha$$

The accuracy of these equations will readily be appreciated from FIGURE 3.

Referring now once again to FIGURE 2, the same shows the servomotors 6 and 11, whose inputs are connected, respectively, to the outputs of two servoamplifiers 21 and 20. The servomotor 11, in addition to driving the spindle 8, and hence the slide element 12 and the contact slide 13, also drives a multiplier 22 to which the servomotor 11 is connected. Similarly, the servomotor 6, in additon to being mechanically coupled to the roller 1, is also mechanically coupled to a further multiplier 23. These multpliers have the angle $\alpha$ fed into them, and they have two outputs at which appear the values $x^* \cos \alpha$, $x^* \sin \alpha$, $y^* \sin \alpha$, $y^* \cos \alpha$. These values appear preferably in electrical form. The multipliers themselves may be constituted, for example, by electromechanical resolvers or by electrical circuits, for example, potentiometers.

The servoamplifier 20 has the following values applied to it:

(1) the value $x_0$;
(2) the product $x^* \cos \alpha$ derived from multiplier 22;
(3) the product $y^* \sin \alpha$ derived from multiplier 23;
(4) the unchanged position coordinate $x$ with the opposite algebraic sign.

Similarly, the servoamplifier 21 has applied to it:

(1) the value $y_0$;
(2) the product $y^* \cos \alpha$ derived from multiplier 23;
(3) the product $x^* \sin \alpha$ derived from multiplier 22;
(4) the unchanged position coordinate $y$ with the opposite algebraic sign.

The two servomotors 6 and 11 are energized until the sum of the voltages applied to their respective inputs equals 0, that is to say, the motor 11 will run until the inputs applied to the servoamplifier equal 0, and the motor 6 will run until the inputs applied to the servoamplifier 21 equal 0. The motors will then be in the correct positions $x^*$ and $y^*$.

Figure 4:
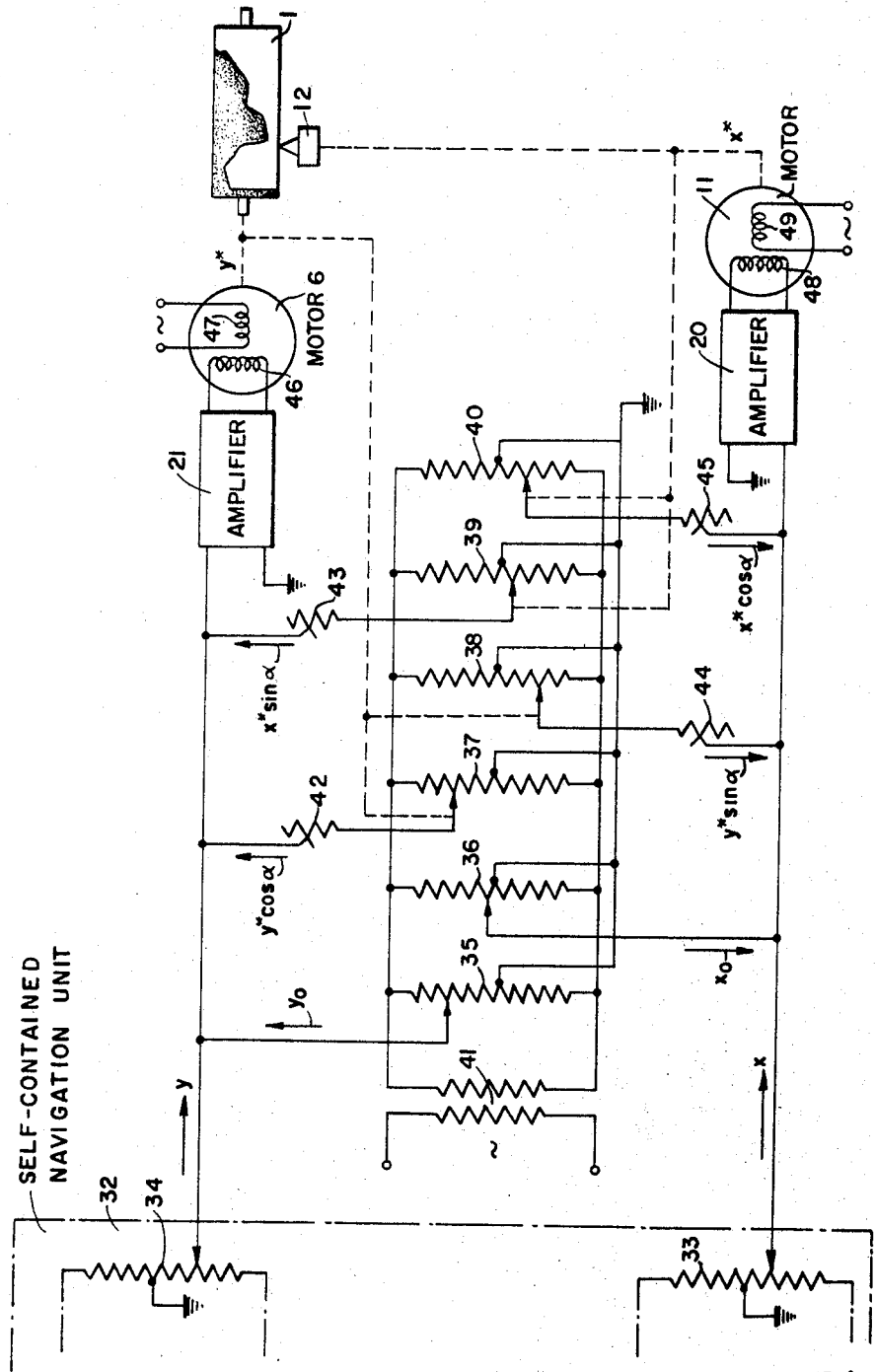
FIGURE 4 is a circuit diagram showing the coaction of the components of FIGURE 1 and 2.

FIGURE 4 is a circuit diagram showing further details of the present invention. The system includes a self-contained navigational unit, of a type known per se, which contains two potentiometers 33 and 34 from which are derived alternating currents proportional to $x$ and $y$, respectively. The phase position of the alternating current determines the algebraic signs of $x$ and $y$. Also shown are the servoamplifiers 20 and 21, the servomotors 11 and 6, as well as the roller 1 and the slide element 12. As is conventional, the solid lines represent electrical connections and the dashed lines represent mechanical connections.

FIGURE 4 shows six potentiometers 35, 36, 37, 38, 39, 40, which are connected in parallel across the secondary winding of a transformer 41, whose primary winding is energized from a source of alternating current. The center taps of the potentiometers 35 through 40 are grounded. The positioning coordinates $x_0$, $y_0$, are set by means of the taps of the potentiometers 36 and 35, respectively. The potentiometers 37 and 38 are mechanically coupled with the servomotor 6 and the tops of the potentiometers 39 and 40 are mechanically coupled with the servomotor 11. Thus, an electrical equivalent of the mechanical position $x^*$ can be derived from the potentiometers 37 and 38, and the electrical equivalent of the mechanical position $y^*$ can be derived from the potentiometers 39 and 40. These electrical equivalents will, in each case, be currents with flow to ground via the respective amplifier. Further setting resistors 42 and 43 are connected between the amplifier 21 and the taps of the potentiometers 37 and 39, respectively, so that the values $\cos \alpha$ and $\sin \alpha$, respectively, can be adjusted. Similar setting resistors 44 and 45 are connected between the input of amplifier 20 and the taps of the potentiometers 38 and 40, respectively, so that here, too, the values of $\sin \alpha$ and $\cos \alpha$ can be adjusted.

FIGURE 4 also shows that the servomotors 6 and 11 are each provided with two windings 46, 47; 48, 49. One of the two windings of each servomotor, namely, the winding 47 of the servomotor 6 and the winding 49 of the servomotor 11, is energized by a steady alternating current. The windings 46 and 48 are connected to the outputs of the amplifiers 21 and 20, respectively. The amplifiers are so designed that, depending on the phase position of the sum current applied thereto, their respective output voltages will have a phase position of 0° or 180°. The windings 47 and 49 of the two servomotors are in the phase position 90° so that the motors will, under all circumstances, produce a torque, the direction of the torque depending on the phase position of the input currents of the respective amplifiers.

The system operates as follows:

Let it be assumed that the system starts out at an instant at which the individual currents applied to the amplifiers cancel each other so that the output signals of the amplifiers equal 0, as a result of which the sesvomotors 11 and 6 and hence the roller 1 and the slide element 12 are at rest. If the craft now moves in a direction parallel to the $y$-axis, that is to say, if the $y$-value now changes while the $x$-value remains constant, the input currents applied to the amplifier 21 will no longer remain in equilibrium. As a result, the motor 6 is energized and will rotate the roller 1 and also move the slide of the potentiometer 37 until $y^* \cos \alpha$ is changed to such an extent that the currents are once more in equilibrium. On the other hand, the change of $y^*$ also causes the slide of potentiometer 38 to be displaced, as a result of which the input currents applied to the amplifier 20 would likewise no longer be in equilibrium, and the motor 11 is therefore now energized. This, in turn, displaces the potentiometer 40 until equilibrium is once again established. But the adjustment of the potentiometer 39 perforce entails a new change of $y^*$ and so on, until the basic equations according to which the device operates are satisfied.

The same applies if both of the input quantities $x$ and $y$ change simultaneously. While the above events are described step by step, the various changes will, in practice, occur simutlaneously, so that the roller 1 is rotated and the slide 12 displaced linearly in a stepless manner, and the roller 1 and slide element 12 will, in fact, rapidly assume positions comparable to the position of the craft.

Figure 5:
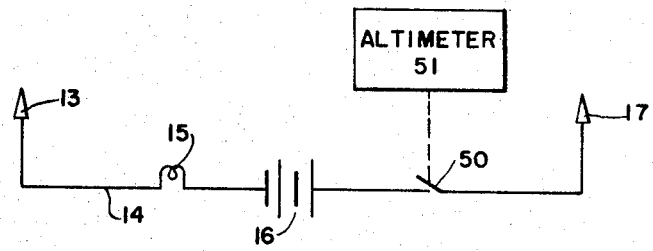
FIGURE 5 is a schematic circuit diagram showing the electrical connections of a modified embodiment of the indicator deivce of FIGURE 1.

The present invention is not limited for use under circumstances where the pilot wishes to avoid overflying a certain line. For example, the apparatus can be used for controlling the altitude over densely populated regions. These regions can be applied individually on the roller 1, and suitable electrical connections may be provided within the roller 1 between the individual conductive regions and a conductive ring at one end of the roller, which ring is contacted by the stationary slide 17, as depicted in FIGURE 1. The circuit incorporating the elements 13, 14, 15, 16, and 17 may then be expanded, as shown in FIGURE 5, to include a switch 50 which coacts with an altimeter 51 that closes the switch 50 whenever the aircraft flies below a predetermined altitude. In this way, the signalling means incorporate means which are responsive to another parameter—here, altitude—and which permit actuation of the signalling means only when this parameter exceeds a predetermined threshold value, in that the light 15 will be energized only if the aircraft flies over congested areas below a given minimum altitude.

Figure 6:
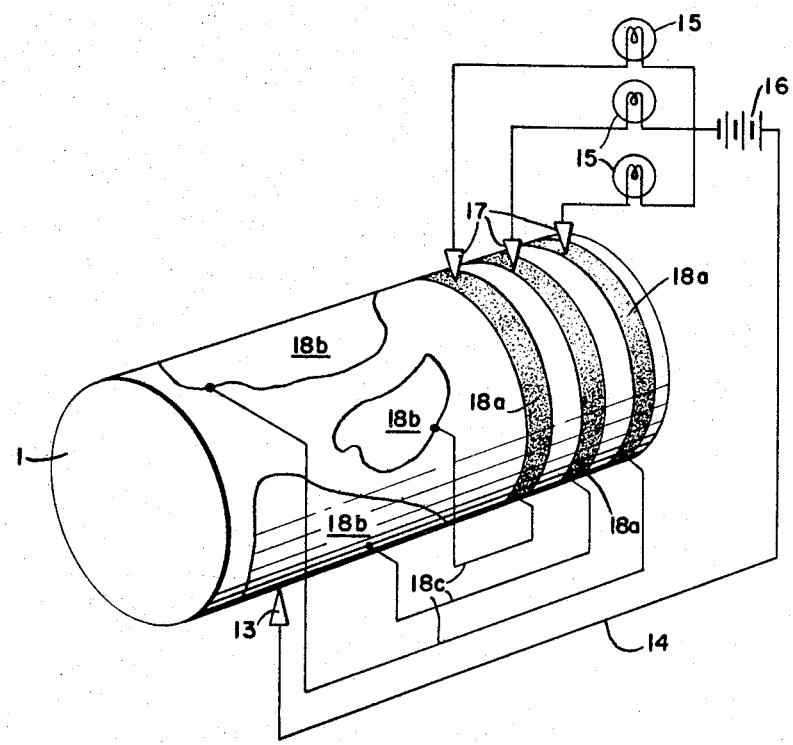
FIGURE 6 is a perspective view of a modification of the basic elements of the indicator device of FIGURE 1.

If desired, the roller 1 may, as shown in FIGURE 6, be provided with a plurality of slip rings 18a each of which coacts with respective stationary pick-up brush 17, each brush being connected in circuit with its own indicator lamp 15. The surface of the roller 1 may be provided, as explained above, with a plurality of individual metallic zones 18b, each of which is connected with a respective one of the slip rings 18a, so that, depending which of the zones is overflown, a separate signal lamp 15 will be energized.

The present invention has been found to be particularly advantageous over existing devices in cases involving the separate signalling for different warning zones. As a practical matter, the accuracy with which the signal is produced is substantially improved, firstly, because the warning zone or zones can, in a device according to the present invention be applied directly and to scale to the roller 1, secondly, because no pre-amplifiers for the $x$ and $y$ values are needed, and thirdly, because the servoamplifiers can be relatively simple and inexpensive motors.

The output values $x^*$ and $y^*$ produced by the apparatus according to the present invention can readily be applied to additional accessories. One such accessory would be the type of instrument in which the position of the craft is indicated directly on the map, i.e., the so-called ground-following type of indicator devices. Also, by applying the values $x^*$ and $y^*$ to conventional analog-to-digital converters, the position of the craft can be indicated digitally. Also, the path followed by the craft can be stored digitally on any suitable record carrier, as, for example, magnetic tape. This means that the circuit shown in FIGURE 4 can, if desired, be used in conjunction with a conventional map following device which incorporates a map section or strip and an indicator or marker which shows the position of the craft on the map. In devices of this type, the indicator and the map move relative to each other, and the drives which bring about the relative movement of the marker and map may have applied to them the signals $x^*$, $y^*$. For example, the map may be in the form of a strip which is wound onto rollers, the winding and unwinding of the strip map depending on one coordinate of the position of the craft, while the indicator is moved transversely to the direction of movement of the strip map in response to the other coordinate of the position of the craft. Inasmuch as the problems incident to the actuation of such a device are analogous to those encountered in the actuation of the device shown in FIGURE 1, the circuit of FIGURE 4 may be used to advantage in a system including such a ground-following map device and a self-contained navigation unit which puts coordinates in a system having a variable origin.

Conversely, the servomotors of the apparatus shown in FIGURE 1 can have applied to them coordinate signals derived from classical navigation systems, i.e., systems which are not self-contained but which rely in part on ground equipment.

It will thus be seen that, in accordance with the present invention, the surface of the earth and certain critical regions thereof are reproduced, to scale, on the cylinder which itself has portions of different electrical conductivity, the instantaneous position of the craft being simulated by the relative position between the contact slide and the roller. The number of individual prohibited regions whose overflight is to be avoided can trigger separate signals, and experience has shown that the number of such regions can be increased to an appreciable extent without unduly increasing the expense of the equipment.

For control and discipline purposes, where the crew of the aircraft is prohibited from overflying certain areas, the output signals can be applied to a recording device which makes a permanent record of any transgressions across the prohibited zones, which recording device is made inaccessible to the crew and accessible to authorized personnel only.

While reference has so far been made only to aircraft, the present invention is not limited to flying craft, but can be used, for example, for marine navigation, inclduing submarines, in which case the system can be used to alert the navigator to prevent the ship from sailing in the region of shoals, reefs, or, in war-time, over known mine fields.

It will be understood that the above description of the present invention is susceptible to various modifications, changes, and adaptations, and the same are intended to be comprehended within the meaning and range of equivalents of the appended claims.

What is claimed is:

1. In a navigation system, an indicating device for indicating the position of a craft with respect to the surface of the earth, said indicating device comprising, in combination:
   (a) means forming a map whose surface is divided into at least two regions which are scale representations, in two dimensions, of respective regions on the surface of the earth, said regions of said map surface being constituted by surface portions having different electrical conductivity with one of said surface portions being an electrically conductive surface portion;
   (b) an eletcric contact slide arranged to engage said surface of said map means;
   (c) positioning means for causing said map means and said slide to occupy a position relative to each other which is representative of the position of the craft with respect to the surface of the earth; and
   (d) electrical signalling means in circuit with at least said electrically conductive surface portion of said map means and said electric contact slide for indicating whether or not said slide is in engagement with said electrically conductive surface portion.

2. An indicating device as defined in claim 1 wherein said map means comprise a roller which has a cylindrical surface constituting said map surface, wherein means are provided for mounting said contact slide for to and fro movement in a direction parallel to the axis of said roller, and wherein said positioning means are responsive to a Cartesian coordinate system and include means for rotating said roller about its axis in response to one of the two coordinates and means for moving said contact slide in said direction parallel to said roller axis in response to the other of said two coordinates.

3. An indicating device as defined in claim 1 wherein said map means include a plurality of different surface portions each of which is a scale representation of a respective region on the surface of the earth, and each of which is an electrically conductive surface portion, said signalling means being in circuit with each of said electrically conductive surface portions of said map means.

4. An indicating device as defined in claim 3 wherein said signalling means include a plurality of signalling elements, each in circuit with a respective one of said electrically conductive surface portions.

5. An indicating device as defined in claim 1 wherein said signalling means incorporate means which are responsive to a given parameter and which permit actuation of said signalling means only when said given parameter exceeds a predetermined threshold value.

6. An indicating device as defined in claim 5 wherein said parameter is altitude.

7. An indicating device as defined in claim 1 wherein said signalling means include a recording device which is inaccessible to the crew of the craft.

8. A navigation system for indicating the position of a craft with respect to the surface of the earth and comprising, in combination:

(a) means forming a map, in a Cartesian coordinate system $x^*$, $y^*$, of fixed origin, the surface of which map is divided into at least two regions which are scale representations of respective regions on the surface of the earth, said regions of said map surface being constituted by surface portions having different electrical conductivity with one of said surface portions being an electrically conductive surface portion;

(b) an electric contact slide arranged to engage said surface of said map means;

(c) positioning means for causing said map means and said slide to occupy a position relative to each other which is representative of the position of the craft with respect to the surface of the earth, said positioning means including a first servomotor for effecting movement in response to the coordinate $x^*$ and a second servomotor for effecting movement in response to the coordinate $y^*$;

(d) a self-contained navigation unit which puts out coordinates in a Cartesian coordinate system $x$, $y$, of variable origin, the output of said unit which represents the coordinate $x$ being applied to said first servomotor and the output of said unit which represents the coordinate $y$ being applied to said second servomotor;

(e) means for deriving from said first servomotor a value $x^*$ which is a function of the mechanical position of said first servomotor and for deriving from said second servomotor a value $y^*$ which is a function of the mechanical position of said second servomotor;

(f) means for multiplying the value $x^*$ by $\cos \alpha$ ($\alpha=$ the angle between said coordinate system $x$, $y$ and $x^*$, $y^*$) and for applying the thus-obtained product to said first servomotor;

(g) means for multiplying $x^*$ by $\sin \alpha$ and for applying the thus-obtained product to said second servomotor;

(h) means for multiplying $y^*$ by $\cos \alpha$ and for applying the thus-obtained product to said second servomotor;

(i) means for multiplying $y^*$ by $\sin \alpha$ and for applying the thus-obtained product to said first servomotor; and (j) electrical signalling means in circuit with at least said electrically conductive surface portion of said map means and said electric contact slide for indicating whether or not said slide is in engagement with said electrically conductive surface portion.

9. An indicating device as defined in claim 8 wherein said means (e) comprise potentiometer means, each mechanically conected to the respective servomotor.

10. An indicating device as defined in claim 8 wherein each of said multiplying means comprises a potentiometer.

11. An indicating device as defined in claim 8 wherein said map means comprise a roller which has a cylindrical surface constituting said map surface, wherein means are provided for mounting said contact slide for to and fro movement in a direction parallel to the axis of said roller, wherein one of said servo-motors is mechanically connected to said roller for rotating the same about its axis in response to the coordinate which controls such servomotor, and wherein the other of said servo-motors is mechanically connected to said contact slide for moving the same in said parallel direction in response to the coordinate which controls such servomotors.

References Cited

UNITED STATES PATENTS

| | | | |
|---|---|---|---|
| 2,718,448 | 9/1955 | Powers | 346—18 |
| 2,857,234 | 10/1958 | Murray | 346—8 |
| 3,345,636 | 10/1967 | McLaren | 340—62 XR |

JOHN W. CALDWELL, *Primary Examiner.*

ALVIN H. WARING, *Assistant Examiner.*

U.S. Cl. X.R.

340—23, 282; 346—8